Feb. 18, 1941. W. W. SLOANE 2,232,081
CONVEYER
Filed July 19, 1939 4 Sheets-Sheet 1
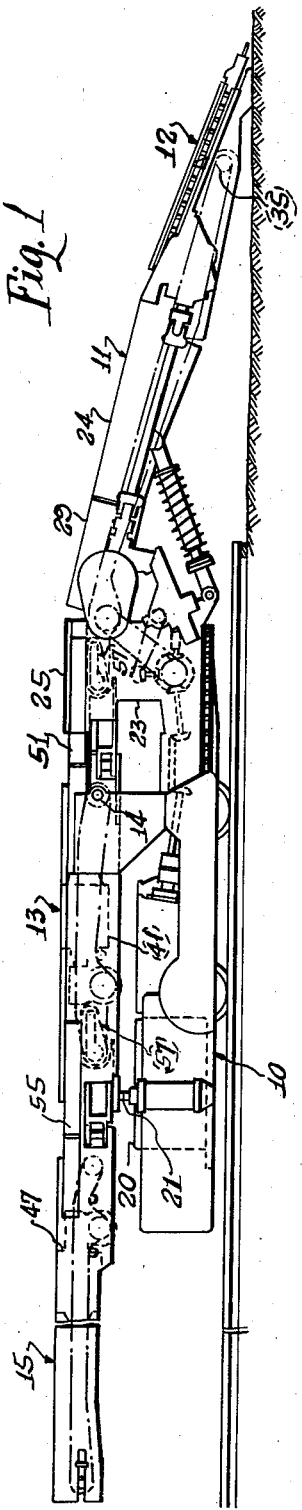
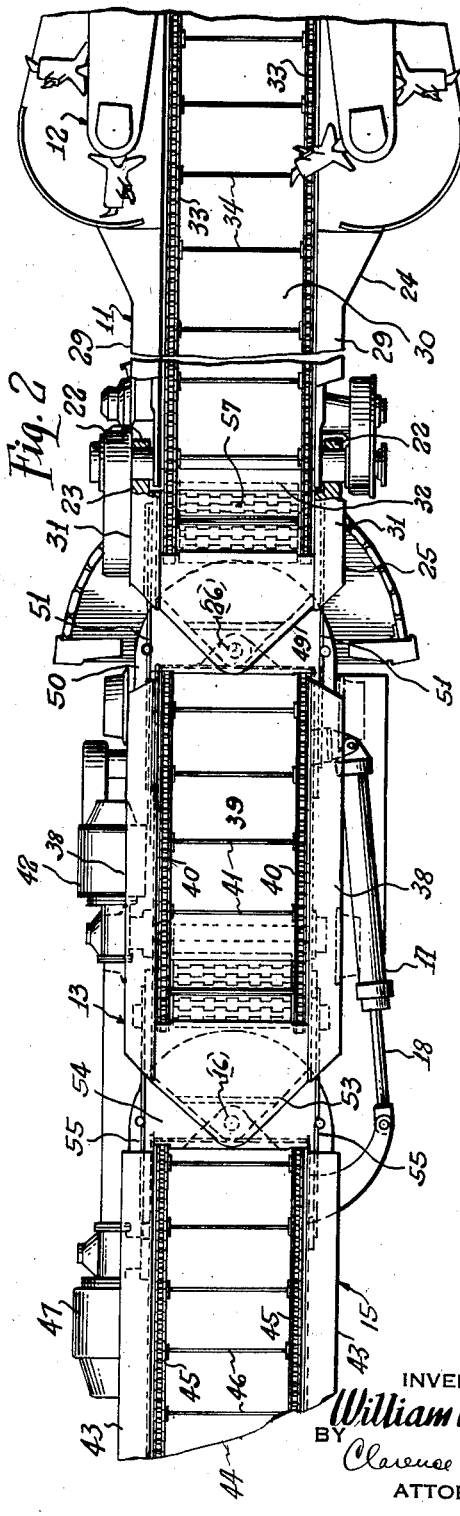
INVENTOR
*William W. Sloane*
BY *Clarence T. Poole*
ATTORNEY

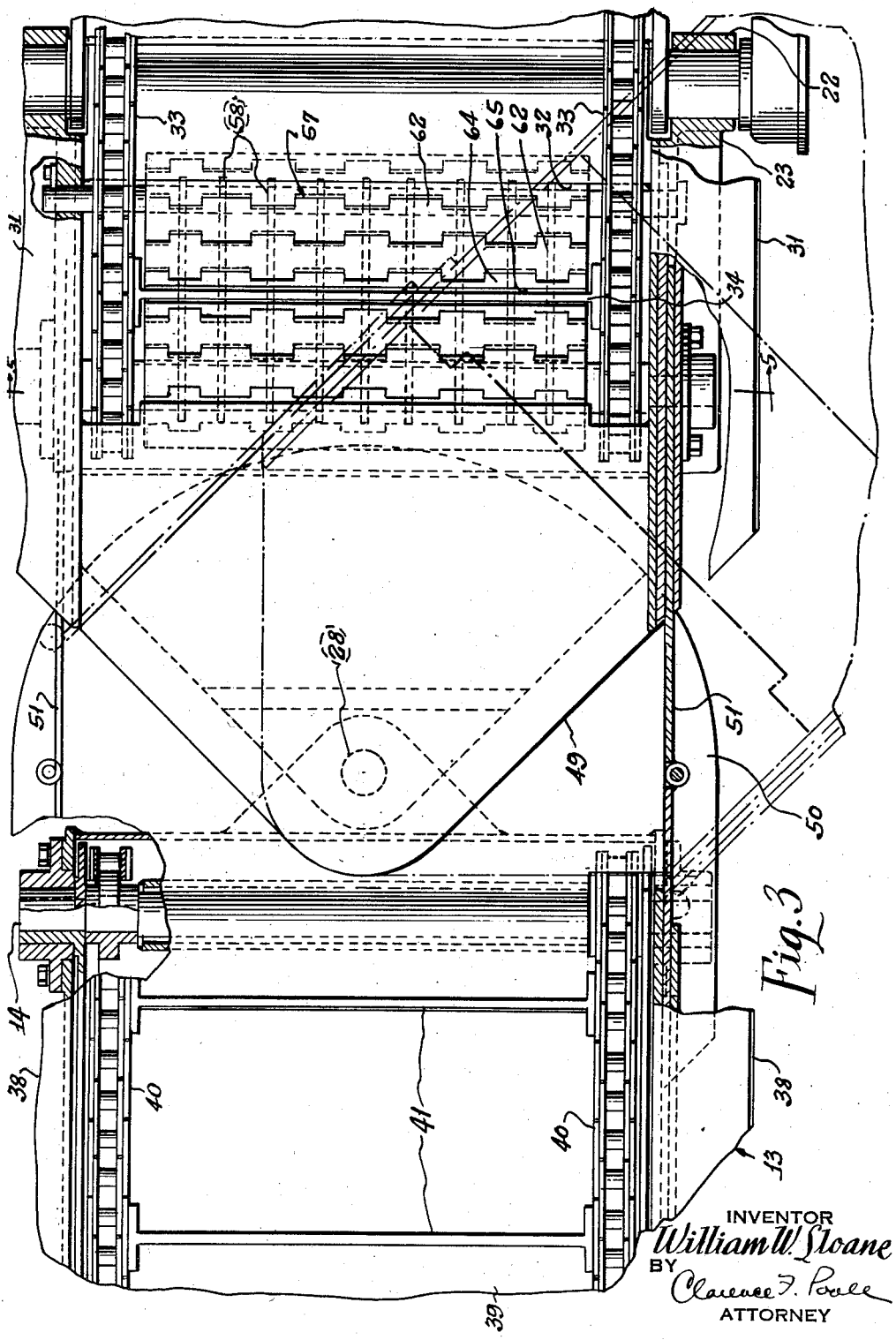

Feb. 18, 1941.  W. W. SLOANE  2,232,081
CONVEYER
Filed July 19, 1939  4 Sheets-Sheet 3
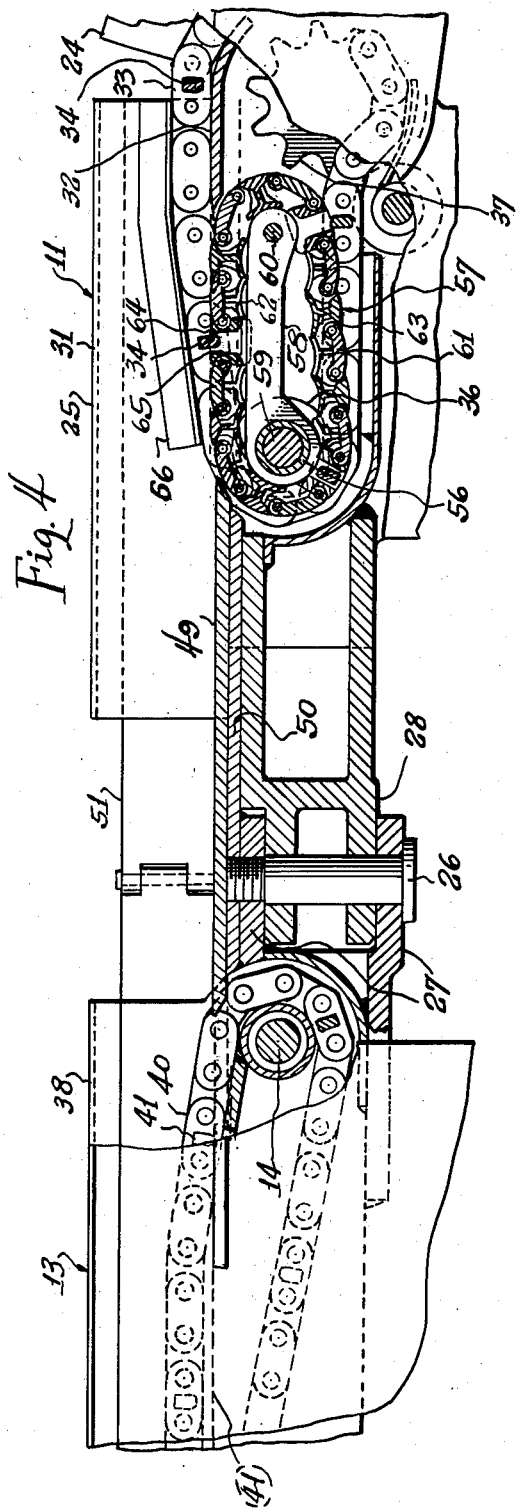
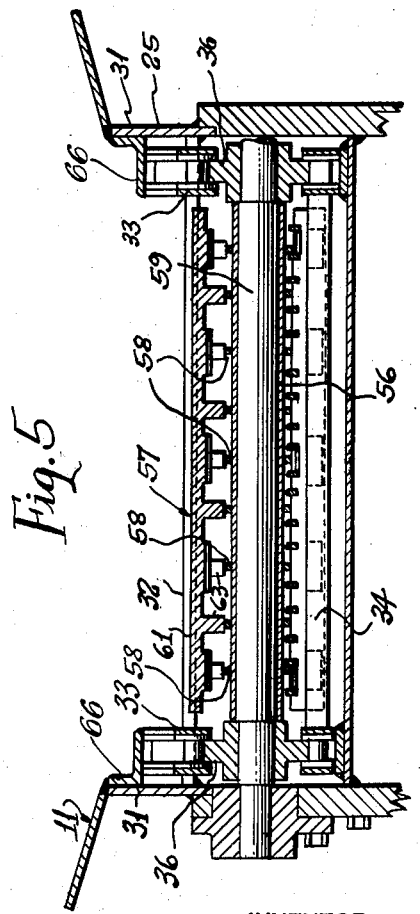
INVENTOR
William W. Sloane
BY
Clarence F. Poole
ATTORNEY Feb. 18, 1941.   W. W. SLOANE   2,232,081
CONVEYER
Filed July 19, 1939   4 Sheets-Sheet 4
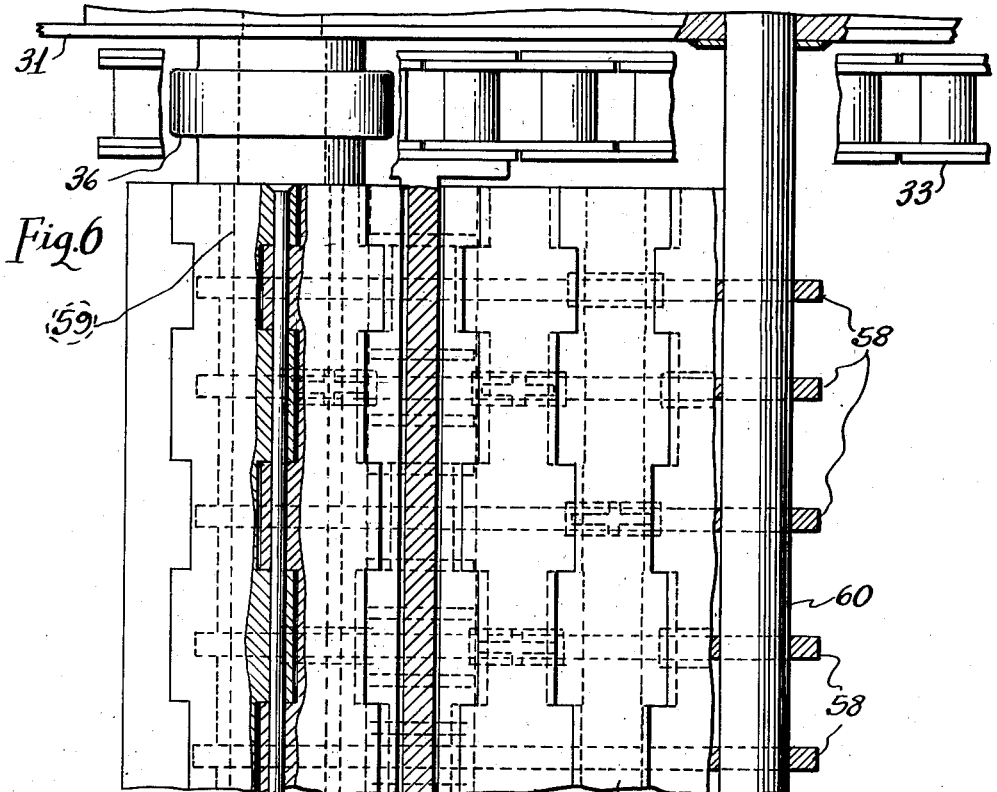
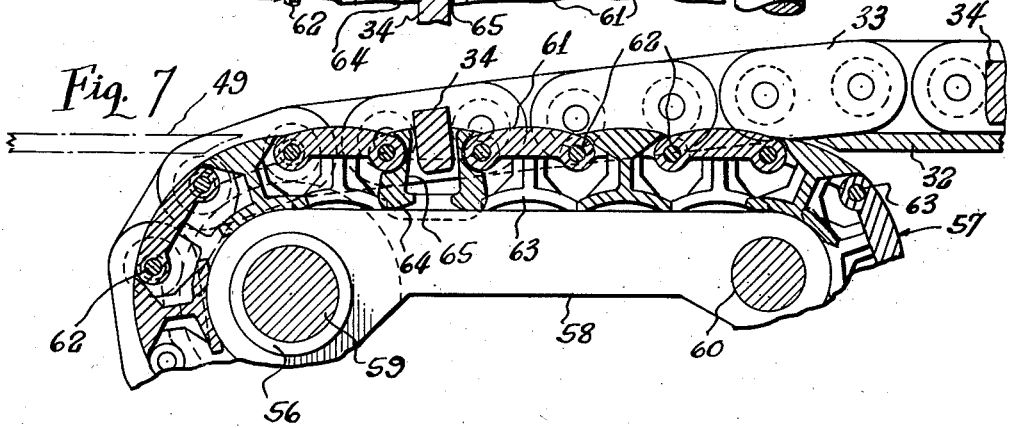
INVENTOR
William W. Sloane
BY
Clarence F. Poole
ATTORNEY Patented Feb. 18, 1941

2,232,081

UNITED STATES PATENT OFFICE 2,232,081

CONVEYER

William W. Sloane, Chicago, Ill., assignor to Goodman Manufacturing Company, Chicago, Ill., a corporation of Illinois Application July 19, 1939, Serial No. 285,371

12 Claims. (Cl. 198—100)

This invention relates to improvements in conveyers, and more particularly to an articulated train of conveyers adapted for use with loading machines and so arranged that material can be discharged from one conveyer to the other when the conveyers are in various positions of articulation, without providing the usual overhanging relation or drop between the discharge and receiving conveyer.

A prior application Serial No. 210,228, filed May 26, 1938, patented Feb. 13, 1940, No. 2,189,869, shows the same general form of conveyer train as is disclosed in my present invention. My present invention, however, differs from my prior invention in the arrangement for receiving the flights of the conveyer and recessing them so their tops are on a level with the bottom of the conveyer at the rear turning point thereof.

The principal object of my invention is to provide a flexible flight receiving means at the discharge end of a conveyer, for successively receiving and recessing the flights of the conveyer beneath the bottom plate of the conveyer, so said flight receiving means may form a movable continuation of the bottom plate of the conveyer to permit the succeeding flights of the conveyer to move material onto another conveyer having a receiving end on substantially the same level as the first conveyer.

A more specific object of my invention is to provide a means for transferring material from one conveyer to another, when said conveyers are in various angular positions of adjustment with respect to each other, which includes a continuous flight receiving chain at the discharge end of the first conveyer, so arranged as to receive and recess successive flights of the conveyer, so their top surfaces are substantially on a level with the upper surface of the chain, and permit the succeeding flights of the conveyer to move material over this chain and transfer it onto a second conveyer having its receiving end on substantially the same general level as the discharge end of the first conveyer.

Other objects of my invention will appear from time to time as the following specification proceeds and with reference to the accompanying drawings wherein:

Figure 1 is a view in side elevation of a loading machine having a conveyer train constructed in accordance with my invention as a part thereof;

Figure 2 is a slightly enlarged view of the machine shown in Figure 1, with the front and rear ends thereof broken away, and with certain parts shown in horizontal section;

Figure 3 is an enlarged fragmentary detail plan view showing the discharge end of one conveyer and the receiving end of the other conveyer, with certain parts broken away and certain other parts shown in horizontal section;

Figure 4 is an enlarged fragmentary detail view in side elevation, with certain parts broken away, showing the discharge end of one conveyer and the receiving end of the other conveyer in substantially longitudinal section;

Figure 5 is a fragmentary transverse sectional view taken substantially along line 5—5 of Figure 3, and drawn to a slightly reduced scale;

Figure 6 is an enlarged fragmentary detail plan view, with parts broken away and certain other parts shown in horizontal section, showing certain details of the invention at the discharge end of one conveyer; and Figure 7 is an enlarged fragmentary detail longitudinal sectional view, showing certain details at the discharge end of the conveyer shown in Figure 6.

Referring now in particular to the drawings, the embodiment of my invention illustrated is shown in conjunction with a face loading machine which includes a wheeled truck or main frame 10 having an elevating conveyer 11 projecting forwardly from the forward end thereof to the ground. Gathering mechanism 12 is mounted on the forward end of said elevating conveyer for picking up material and depositing it onto said elevating conveyer in the usual manner. A transfer conveyer 13 extends centrally of the machine and has its receiving end spaced rearwardly from the discharge end of said elevating conveyer. Said transfer conveyer has a discharge conveyer 15 pivotally connected to the rear end thereof, for horizontal swinging movement about a vertical shaft 16. The receiving end of said discharge conveyer is likewise spaced rearwardly from the discharge end of said transfer conveyer. Said transfer and discharge conveyers are herein shown as being mounted for adjustment about an axis coaxial with a transverse shaft 14, disposed at the forward end of said transfer conveyer, and herein shown as being coaxial with the axis about which the chains of said conveyer turn at the forward end thereof. Vertical adjustment of said transfer and discharge conveyers is effected by a suitable adjusting mechanism generally indicated by reference character 21, and not herein shown or described in detail since it is no part of my present invention. Said discharge conveyer is adjustably swung about the axis of the shaft 16 by a suitable fluid pressure cylinder 17 and piston 18 in a usual manner.

The elevating conveyer 11 includes an inclined forward portion 24 and a stationary discharge portion 25. Said inclined forward portion of said conveyer is mounted for vertical adjustment on trunnion supports 22, 22. Said trunnion supports project forwardly from a support frame 23, mounted on the truck frame 10 for horizontal swinging movement with respect thereto, to permit movement of said elevating conveyer from one side of the track to the other. Said stationary discharge portion is pivotally connected to the forward end of said transfer conveyer by a vertical stud shaft 26, extending through forwardly projecting bifurcated ends 27, 27 of the frame portion of the transfer conveyer 13, and through the interengaging bifurcated ends of a bracket 28, projecting rearwardly from the rear end of said discharge portion (see Figure 4). Said stud shaft is mounted coaxial with the axis of swinging movement of the support frame 23.

The inclined portion 24 of the elevating conveyer 11 includes a pair of side frame members 29, 29 connected together by a bottom plate 30, and the discharge portion 25 of said elevating conveyer includes a pair of side frame members 31, 31 connected together by a bottom plate 32.

The material moving elements of said elevating conveyer consist of a pair of spaced apart endless chains 33, 33, connected together by flights 34, 34 at suitable intervals. Said endless chains are trained around a direction changing device 35 at the front end of said conveyer, and are guided for movement upwardly therefrom along the bottom plates 30 and 32, around direction changing devices 36 at the rear end of said discharge conveyer, and forwardly therefrom under drive sprockets 37, 37, mounted coaxially with the axis of vertical swinging movement of said inclined portion of said conveyer. Said drive sprockets are driven by a motor 20, mounted on said truck, in a suitable manner, which is no portion of my present invention so is not herein shown or described in detail.

The intermediate conveyer 13 includes a pair of side frame members 38, 38, connected together by a bottom plate 39. The material moving elements of said conveyer include a pair of spaced apart endless chains 40, 40, connected together by flights 41, 41 at suitable intervals. A motor 42 is provided to drive said chains in a well known manner.

The discharge conveyer 15 includes a pair of spaced apart side frame members 43, 43 connected together by a bottom plate 44. The material moving elements of said conveyer likewise include a pair of spaced apart endless chains 45, 45 connected together by flights 46, 46 at suitable intervals, and driven by a motor 47, in a usual manner.

A transfer plate 49 projects rearwardly from the discharge end of the elevating conveyer 11 and is provided to close the gap between the bottoms of the conveyers 11 and 13 and forms a bottom plate along which the material may be moved while being transferred from one conveyer to the other by succeeding flights of the first conveyer. Said transfer plate overlaps a plate 50 projecting forwardly from the forward end of the intermediate conveyer 13. The gaps between the side walls of said conveyers are closed when said conveyers are in longitudinal alignment, or in various positions of articulation with respect to each other, by means of hinged closure members 51, 51. Said closure members are slidably guided in the respective side walls of said conveyers in a usual manner, to provide an articulated side wall connection between said conveyers (see Figures 3 and 4).

The transfer conveyer 13 is likewise provided with a rearwardly projecting transfer plate 53 which overlaps a transfer plate 54, projecting forwardly from the discharge conveyer 15. Hinged closure members 55, 55 are also slidably guided in the respective side walls of said transfer and discharge conveyers, in a suitable manner, to close the gaps between said conveyers when said conveyers are in horizontal alignment or in various positions of articulation with respect to each other.

Referring now in particular to the flexible material transferring means forming one of the novel features of my invention, which is arranged to permit material to be transferred from the elevating conveyer 11 onto and across the transfer plate 49 onto the transfer conveyer 13, when said elevating conveyer is in various positions of articulation with respect to said transfer conveyer, and from the transfer conveyer 13 over the transfer plate 53 and onto the discharge conveyer 15, when said discharge conveyer is in various positions of articulation with respect to said transfer conveyer, said material transferring means is similar for each conveyer, so will only be described in detail for the elevating conveyer.

The material transferring means, as herein shown, includes an endless flight receiving chain 57, of such a width as to extend between the conveyer chains 33, 33 of the elevating conveyer 11, and so arranged as to receive an entire flight of the conveyer. Said chain is herein shown as being supported and guided on a plurality of parallel spaced guide shoes 58, 58, for movement about the discharge end of said elevating conveyer in a predetermined path, which is determined by the path of movement of the conveyer chains 33, 33. Said guide shoes are shown as being mounted adjacent their rear ends on a sleeve 56 mounted upon a shaft 59, which also has the rollers 36, 36 mounted thereon. The forward ends of said shoes are mounted on a shaft 60 mounted at its ends in the side frame members 31, 31.

The endless flight receiving chain 57 may be made from a plurality of separate links pivotally connected together, side by side, and in end to end relation, but, as herein shown, includes a plurality of links 61, 61, of a width substantially equal to the length of the flights 34, 34, and connected together by pivotal pins 62, 62 (see Figures 6 and 7). A plurality of spaced apart inwardly extending shoes 63, 63 are herein shown as being formed integrally with each of said links. Said shoes engage and slide along the guide shoes 58, 58 and support said flight receiving chain for movement therealong. Said inwardly extending shoes are so arranged that the shoes on one link will engage every other shoe 58, and the shoes on alternate links will engage alternate shoes 58, 58.

Recessed links 64, 64, for receiving successive flights 34, 34 as they turn around the direction changing devices 36, 36, are connected to certain links 61, 61 of the chain 57, by means of the pivotal pins 62, 62, at suitable intervals, depending upon the spacing of the flights 34, 34. Said recessed links are provided with flight receiving recesses 65, 65 formed therein, open towards the bottom, to prevent clogging with coal dust. The spacing of said recessed links in the chain 57 is such that, as said flights approach their rear turning point, they are received in the recesses 65, 65 and move downwardly therein in a manner which will hereinafter more clearly appear as this specification proceeds.

The forward end of the transfer plate 49 is beveled to overlap the rear end of said chain and conforms to the curvature thereof, as it turns downwardly about the rear end of the guide shoes 58, 58, and the forward portion of said chain is overlapped by the rear end of the bottom plate 32 of the discharge portion 25 of said elevating conveyer, which is likewise beveled to conform to the curvature of said chain as it turns upwardly about the forward end of the guide shoes 58, 58. Said chain thus forms a continuous movable bottom between said bottom and transfer plates so as to provide a continuous material carrying surface from one plate to the other, to permit material to be moved by said chain and succeeding flights of the conveyer across said transfer plate onto the next succeeding conveyer.

Angles 66, 66 are secured to the inner sides of the side frame members 31, 31 and have inwardly projecting legs which engage the tops of the chains 33, 33 (see Figure 4). Said angles are provided to aid in guiding the upper runs of the endless chains 33, 33 in predetermined paths which are inclined downwardly towards the discharge end of the conveyer in such a manner that the paths of said chains converge into the path of the flight receiving chain 57, and the paths of said conveyer chains and flight receiving chain are coincident as said conveyer chains turn about the rear ends of the guide shoes 58, 58. Thus, as the flights 34, 34 approach said flight receiving chain, their relative movement with respect to said flight receiving chain will be such that they will enter the recesses 65 of the links 64 of said flight receiving chain and be completely recessed within said flight receiving chain as they pass beneath the forward end of the transfer plate 49 and turn about the shaft 59, and will form a means for driving said flight receiving chain about said guide shoes.

It may thus be seen that a new and improved means of a novel construction has been provided, to permit the transfer of material from one conveyer to another conveyer, having a receiving end disposed in substantially on the same level as the first conveyer, when said conveyers are in various positions of adjustment with respect to each other, and that this is effected by providing an endless flight receiving chain at the discharge end of one conveyer, which extends between the chains of the conveyer and provides an uninterrupted movable bottom between the rear end of the bottom of the discharge conveyer and the forward end of a transfer plate overlapping said chain, and that this flight receiving chain is recessed at suitable intervals, to receive successive flights of the conveyer and recess them within said chain at their rear turning point, so that their upper surface will be on substantially the same level as the top of said transfer plate, to enable material carried by the flights of the conveyer to be moved from said flight receiving chain onto said transfer plate, and to be progressed thereacross onto the next succeeding conveyer by said flight receiving chain and under propulsion from succeeding flights of the conveyor, acting through the body of material on said transfer plate.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In an apparatus of the class described, a flight conveyer including a pair of spaced apart endless chains having flights mounted therebetween, a transfer plate having a top surface forming a continuation of said conveyer, and means permitting successive flights of the conveyer to deposit material onto said transfer plate and move it thereacross including an endless chain extending between the chains of said conveyer at the discharge end thereof, said chain forming a movable bottom for the discharge end of the conveyer, and being recessed at suitable intervals, to receive successive flights of the conveyer.

2. In an apparatus of the class described, a flight conveyer including a pair of spaced apart endless chains having flights mounted therebetween, a transfer plate having a top surface forming a continuation of said conveyer, and means permitting successive flights of the conveyer to deposit material onto said transfer plate and move it thereacross including an endless chain extending between the chains of said conveyer at the discharge end thereof, said chain forming a movable bottom for the discharge end of the conveyer, and being recessed at suitable intervals, to receive successive flights of the conveyer, means for guiding said flight receiving chain in a predetermined path, and means for guiding said conveyer chains in a path converging into the path of said flight receiving chain, to cause the flights of said conveyer to be recessed within said conveyer chain as they pass around the discharge end of said conveyer.

3. In an apparatus of the class described, a flight conveyer including a pair of spaced apart endless chains having flights mounted therebetween, a transfer plate having a top surface forming a continuation of said conveyer, and means permitting successive flights of the conveyer to deposit material onto said transfer plate and move it thereacross including an endless chain extending between the chains of said conveyer at the discharge end thereof, said chain forming a movable bottom for the discharge end of the conveyer, and said chain having a recessed link to receive successive flights of the conveyer and permit said flights to drive said chain.

4. In an apparatus of the class described, a flight conveyer including a pair of spaced apart endless chains having flights mounted therebetween, a transfer plate having a top surface forming a continuation of said conveyer, and means permitting successive flights of the conveyer to deposit material onto said transfer plate and move it thereacross including an endless chain extending between the chains of said conveyer at the discharge end thereof, said chain forming a movable bottom for the discharge end of the conveyer, and forming a continuation of the upper surface of said flight receiving chain, a guide shoe along which said chain moves, the path of said chain at the discharge end of said conveyer conforming substantially to the path of travel of said conveyer chains as they turn around the discharge end of said conveyer, and said chain being recessed to receive successive flights of the conveyer and recess said flights beneath the top of said transfer plate as they pass thereby.

5. In an apparatus of the class described, a flight conveyer including a bottom plate having a pair of spaced apart endless chains movable along opposite sides thereof, flights mounted between said chains at suitable intervals, a transfer plate having a top surface forming a continuation of said conveyer, and means permitting successive flights of the conveyer to deposit material onto said transfer plate and move it thereacross including an endless flight receiving chain at the discharge end of said conveyer, the width of which is substantially equal to the distance between the chains of said conveyer, a guide shoe for guiding said chain in a path conforming to the path of said conveyer chains as they turn around the discharge end of said conveyer, and said chain being recessed at suitable intervals to receive successive flights of the conveyer and form an uninterrupted movable bottom for said conveyer between said transfer and bottom plates.

6. In an apparatus of the class described, a flight conveyer including a bottom plate having spaced apart endless chains movable along opposite sides thereof, spaced apart flights mounted between said chains, a direction changing device at the rear end of said conveyer about which said chains turn, a transfer plate having a forward end spaced rearwardly from the rear end of said bottom plate, and a flight receiving chain bridging the gap between said bottom plate and transfer plate and overlapped at its forward and rear ends by said bottom and transfer plates, said chain being recessed to receive successive flights of the conveyer as they pass around said direction changing member.

7. In an apparatus of the class described, a flight conveyer including a bottom plate having spaced apart endless chains movable along opposite sides thereof, spaced apart flights mounted between said chains, a direction changing device at the rear end of said conveyer, about which said chains turn, a transfer plate having a forward end spaced rearwardly from the rear end of said bottom plate, and a flight receiving chain bridging the gap between said bottom plate and transfer plate, the upper run of said chain being guided for movement in a plane substantially parallel to the planes of said transfer and bottom plates and in a path substantially conforming to the path of said conveyer chains as they round said direction changing device, and said conveyer chains being guided in a path converging into the path of said flight receiving chain, to recess successive flights of the conveyer into said flight receiving chain upon movement of the upper runs thereof towards said direction changing device.

8. In an articulated train of conveyers, two conveyers, one of which is horizontally swingable with respect to the other, each of said conveyers including a pair of spaced apart endless chains having spaced apart flights mounted therebetween, a transfer plate disposed between said conveyers, and means permitting material to be moved onto and over said transfer plate onto said rearwardmost conveyer by succeeding flights of said forwardmost conveyer including an endless chain extending between the chains of said forwardmost conveyer, at the discharge end thereof, said last mentioned chain being recessed for receiving successive flights of said conveyer and forming a movable bottom for said conveyer connecting the gap between said discharge conveyer and transfer plate.

9. In an articulated train of conveyers, two conveyers, one of which is horizontally swingable with respect to the other, each of said conveyers including a pair of spaced apart endless chains having flights mounted therebetween, and means permitting material to be moved onto said rearwardmost conveyer by succeeding flights of said forwardmost conveyer including an endless flight receiving chain at the discharge end of said forwardmost conveyer, said chain being guided for movement between the chains of said conveyer and forming a movable bottom for said conveyer at the discharge end thereof, a transfer plate extending between said conveyers in substantially the same plane as said forwardmost conveyer and overlapping the rear end of said flight receiving chain, and said flight receiving chain being recessed for receiving successive flights of said conveyer and permitting them to be recessed below the level of said transfer plate as they pass thereby, so said flight receiving chain may form an uninterrupted bottom for the conveyer adjacent said transfer plate.

10. In an articulated train of conveyers, two conveyers, one of which is horizontally swingable with respect to the other, each of said conveyers including a pair of spaced apart endless chains having spaced apart flights mounted therebetween, a transfer plate disposed between said conveyers, and means permitting material to be moved onto and over said transfer plate onto said rearwardmost conveyer by succeeding flights of the forward conveyer including an endless flight receiving chain disposed between the chains of said conveyer at the discharge end thereof, a guide disposed between the chains of said conveyer, for guiding said chain in a path coincident with the path of the conveyer chains as they turn around the discharge end of said conveyer, and said receiving chain being provided with spaced apart recessed portions, for receiving successive flights of said conveyer as they turn around the rear end thereof, to form an uninterrupted movable bottom for said conveyer at the discharge end thereof and permit said flight receiving chain and successive flights of the conveyer to move material onto and across said transfer plate.

11. In an articulated train of conveyers, two conveyers, one of which is horizontally swingable with respect to the other, each of said conveyers including a pair of spaced apart endless chains having flights mounted therebetween at suitable intervals, a transfer plate disposed between said conveyers, and means permitting material to be moved onto and over said transfer plate onto said rearwardmost conveyer by succeeding flights of the forward conveyer including an endless flight receiving chain at the discharge end of said forward conveyer, the width of which is substantially equal to the distance between said conveyer chains, a guide shoe along which said flight receiving chain is guided, and a plurality of recessed links in said chain, to receive successive flights of the conveyer and permit said chain and succeeding flights of the conveyer to move material across said transfer plate and onto said rearwardmost conveyer.

12. In an articulated train of conveyers, two conveyers, one of which is horizontally swingable with respect to the other, each of said conveyers including a pair of spaced apart endless chains having flights mounted therebetween at suitable intervals, a transfer plate disposed between said conveyers, and means permitting material to be moved onto and over said transfer plate onto said rearwardmost conveyer, by succeeding flights of the forward conveyer, including an endless flight receiving chain at the discharge end of said forward conveyer, the width of which is substantially equal to the distance between said conveyer chains, a guide shoe for guiding said flight receiving chain in a predetermined path, a plurality of recessed links in said flight receiving chain, and said conveyer chains being guided in a path converging into the path of said flight receiving chain, so said flights will move into the recessed links of said flight receiving chain, as they move towards the discharge end of the conveyer, to permit said chain and succeeding flights of the conveyer to move material across said transfer plate and onto the discharge end of said rearwardmost conveyer.

WILLIAM W. SLOANE.